(12) United States Patent
Karnopp et al.

(10) Patent No.: US 9,016,958 B2
(45) Date of Patent: Apr. 28, 2015

(54) PIGTAIL-LESS OPTICAL CONNECTOR ASSEMBLY

(75) Inventors: Roger J. Karnopp, Eagan, MN (US); Gregory M. Drexler, Minnetonka, MN (US); Kevin J. Thorson, Eagan, MN (US)

(73) Assignee: Lockheed Martin Corporation, Bethesda, MA (US)

( * ) Notice: Subject to any disclaimer, the term of this patent is extended or adjusted under 35 U.S.C. 154(b) by 374 days.

(21) Appl. No.: 13/450,883

(22) Filed: Apr. 19, 2012

(65) Prior Publication Data

US 2013/0279858 A1     Oct. 24, 2013

(51) Int. Cl.
*G02B 6/36* (2006.01)
*G02B 6/42* (2006.01)

(52) U.S. Cl.
CPC .............. *G02B 6/421* (2013.01); *G02B 6/4249* (2013.01); *G02B 6/4284* (2013.01); *G02B 6/4292* (2013.01)

(58) Field of Classification Search
None
See application file for complete search history.

(56) References Cited

U.S. PATENT DOCUMENTS

| 6,821,027 | B2 * | 11/2004 | Lee et al. .......................... 385/89 |
| 7,399,125 | B1 | 7/2008 | Whaley et al. |
| 7,854,554 | B1 * | 12/2010 | Karnopp et al. ................. 385/89 |
| 7,905,664 | B1 | 3/2011 | Stevens et al. |
| 8,121,139 | B2 | 2/2012 | Sunaga et al. |
| 8,550,727 | B2 * | 10/2013 | Meadowcroft et al. ......... 385/94 |
| 2003/0180006 | A1 * | 9/2003 | Loh et al. ......................... 385/88 |
| 2003/0180012 | A1 * | 9/2003 | Deane et al. ..................... 385/92 |
| 2010/0215317 | A1 | 8/2010 | Rolston et al. |
| 2011/0052124 | A1 | 3/2011 | Karnopp et al. |
| 2011/0058818 | A1 | 3/2011 | Karnopp et al. |
| 2013/0156386 | A1 * | 6/2013 | Miller .............................. 385/93 |
| 2013/0272664 | A1 * | 10/2013 | Arao et al. ....................... 385/89 |

FOREIGN PATENT DOCUMENTS

JP        2008-90232       4/2008

OTHER PUBLICATIONS

S. Yazdani, "10Gbit/s optical transceiver from C-MAC," Electronics Pub, Oct. 10, 2010; 1 page (found online on Mar. 20, 2012 at http://www.electronicspub.com/news/news.item.php?id=92).

* cited by examiner

*Primary Examiner* — Tina Wong
(74) *Attorney, Agent, or Firm* — Hamre, Schumann, Mueller & Larson, P.C.

(57) ABSTRACT

A pigtail-less optical connector assembly is described that is capable of data rates as high as 10 GHz. The described optical connector assembly connects the optical fiber connector to an optical die element mounted in the connector assembly using optical fiber ribbon and an optical deflecting device. The optical fiber connector is slideable within the connector assembly and is resiliently biased toward a home position. The connector assembly is designed to allow the optical fiber ribbon to flex without damaging the fiber ribbon as the optical fiber connector slides.

9 Claims, 5 Drawing Sheets

PIGTAIL-LESS OPTICAL CONNECTOR ASSEMBLY

FIELD

This disclosure relates to a pigtail-less optical connector assembly having one or more integrated optical die elements, such as optical transmitter die(s), optical receiver die(s), or optical transceiver die(s), integrated therein. The described optical connector assembly is suitable for 10 GHz data transmission and receiving rates.

BACKGROUND

Pigtail-less optical connector assemblies are known from U.S. Pat. Nos. 7,854,554 and 7,905,664. The optical connector assemblies described in these patents have data rates that are limited by a number of factors, including by the electrical flex circuits that are used. However, higher data rates than those provided by these known optical connector assemblies are desirable.

SUMMARY

A pigtail-less optical connector assembly is described that is capable of data transmission and receiving rates (hereinafter referred to simply as "data rate") as high as 10 GHz (10 Gbit/s). One or more of the described optical connector assemblies can be mounted adjacent to an edge of a circuit card for providing optical connection between the circuit card and an optical backplane.

The described optical connector assembly connects the optical fiber connector to an optical die element mounted in the connector assembly using optical fiber ribbon and an optical deflecting device. The optical fiber connector is slideable within the connector assembly and is resiliently biased toward a home position. The connector assembly is designed to allow the optical fiber ribbon to flex without damaging the fiber ribbon as the optical fiber connector slides.

In one embodiment, the connector assembly includes a housing structure having a first end and a second end. An optical fiber connector is adjacent to the first end of the housing structure and is at least partially disposed in the housing structure. The optical fiber connector is exposed outside the housing structure to permit establishment of an optical connection between the connector assembly and an optical connector on an optical backplane. A biasing mechanism is at least partially disposed within the housing structure and acts on the optical fiber connector to bias the optical fiber connector toward the first end. An electrical connector is adjacent to the second end of the housing structure and is at least partially disposed in the housing structure. The electrical connector is exposed outside the housing structure to permit establishment of an electrical connection between the connector assembly and a circuit card on which the connector assembly is to be mounted on. A circuit board is disposed within the housing structure, with the circuit board including at least one optical die element and driver circuitry for the optical die element disposed thereon. Electric circuitry connects the driver circuitry and the electrical connector. An optical deflecting device is disposed within the housing structure adjacent to the optical die element for deflecting an optical path to and from the optical die element. In addition, an optical fiber ribbon is disposed within the housing structure and has a first end that is optically connected to the optical fiber connector and a second end that is optically connected to the optical deflecting device.

In another embodiment, a circuit card assembly is formed by a circuit card with electronic components mounted thereon, and one or more of the described connector assemblies mounted on the circuit card adjacent to an edge thereof with the electrical connector electrically connected to the electronic components.

DRAWINGS

DETAILED DESCRIPTION

Figure 1:
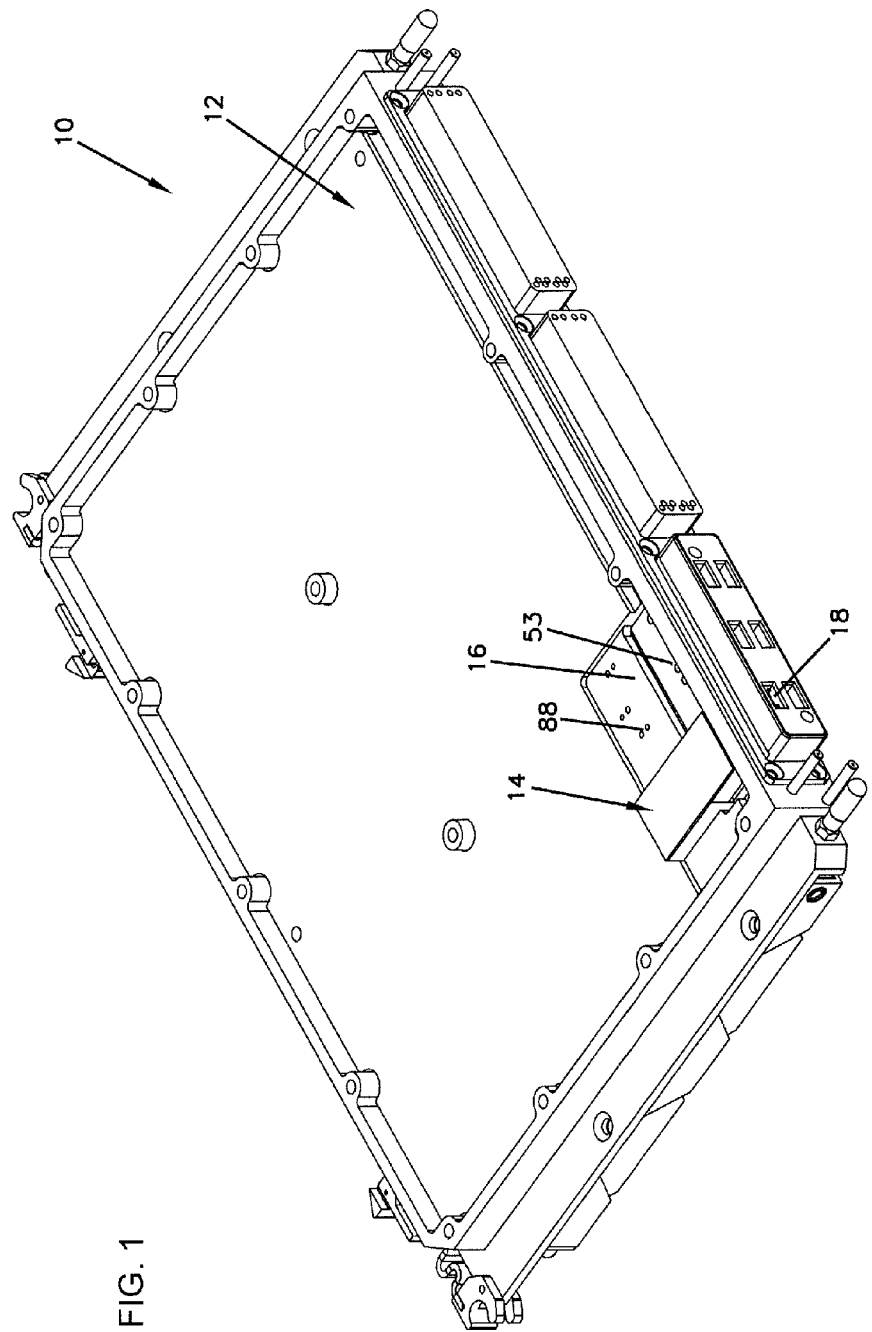
FIG. 1 illustrates a circuit card assembly including an optical connector assembly described herein mounted adjacent the edge of a circuit card.

FIG. 1 illustrates a circuit card assembly 10 that includes a circuit card 12 and an optical connector assembly 14 mounted on the circuit card 12. As is conventional, the circuit card 12 includes a plurality of electronic components (not shown) mounted thereon for performing the design function of the circuit card. The electronic components can be laid out in any desired arrangement and can perform any desired function(s) known to those of skill in the art.

The connector assembly 14 is disposed adjacent to an edge, for example the rear edge, of the circuit card 12 so that the connector assembly 14 can optically connect with a suitable optical connector assembly on an optical backplane (not shown) of conventional construction. The circuit card 12 includes a mounting area 16 adjacent to the edge that is configured for receiving the connector assembly 14. In the illustrated embodiment, the mounting area 16 is configured for receiving up to six of the connector assemblies 14, three of the assemblies 14 on the front or visible side (i.e. visible in FIG. 1) of the circuit card 12 and three of the assemblies on the rear or non-visible side of the circuit card 12. So although only a single connector assembly 14 is illustrated in FIG. 1, a plurality of the connector assemblies 14 can be mounted on the circuit card. As seen in FIG. 1, the circuit card assembly 10 includes six ports 18, one for each of the connector assemblies, which ports 18 facilitate connection to the connector assemblies on the backplane.

Turning now to FIGS. 2-5, the connector assembly 14 will now be described in detail. As described herein, the connector assembly 14 is configured for up to an approximately 10 GHz data rate.

The connector assembly 14 includes a housing structure 20 having a first end 22 and a second end 24. In the illustrated example, the housing structure 20 is formed by three primary components, namely a first package body 26, a second package body 28 and a cover 30. The package body 26 and the package body 28 are formed with a snap fit connection mechanism to connect the package body 26 and the package body 28 together, and formed with open tops that are closed off and covered by the cover 30. In one embodiment, the cover 30 is formed of a material to provide high thermal conductivity, while the package bodies 26, 28 are formed of plastic material that provides electro-static dissipative (ESD) protection.

Figure 3:
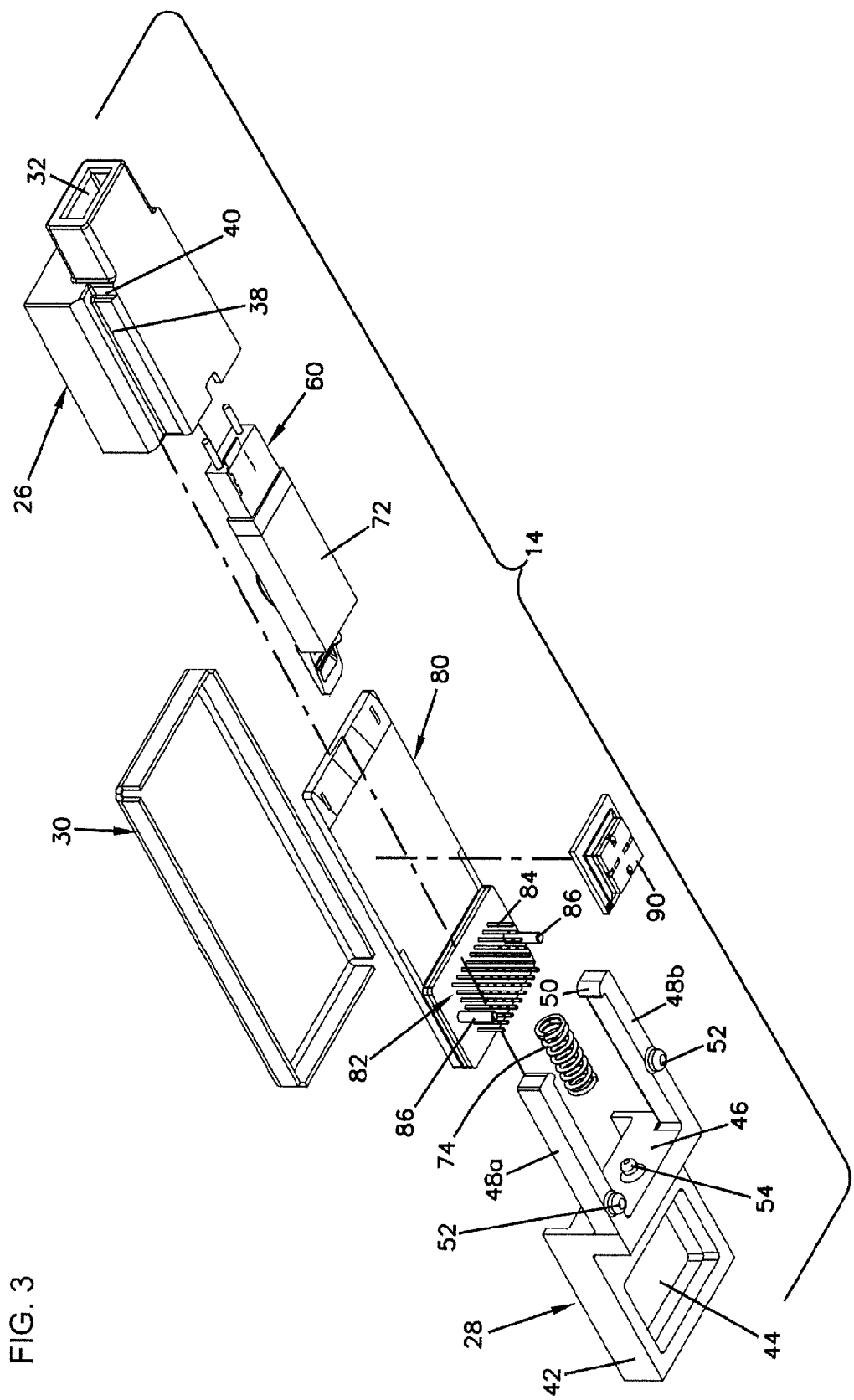
FIG. 3 is an exploded view of the components of the optical connector assembly.
Figure 4:
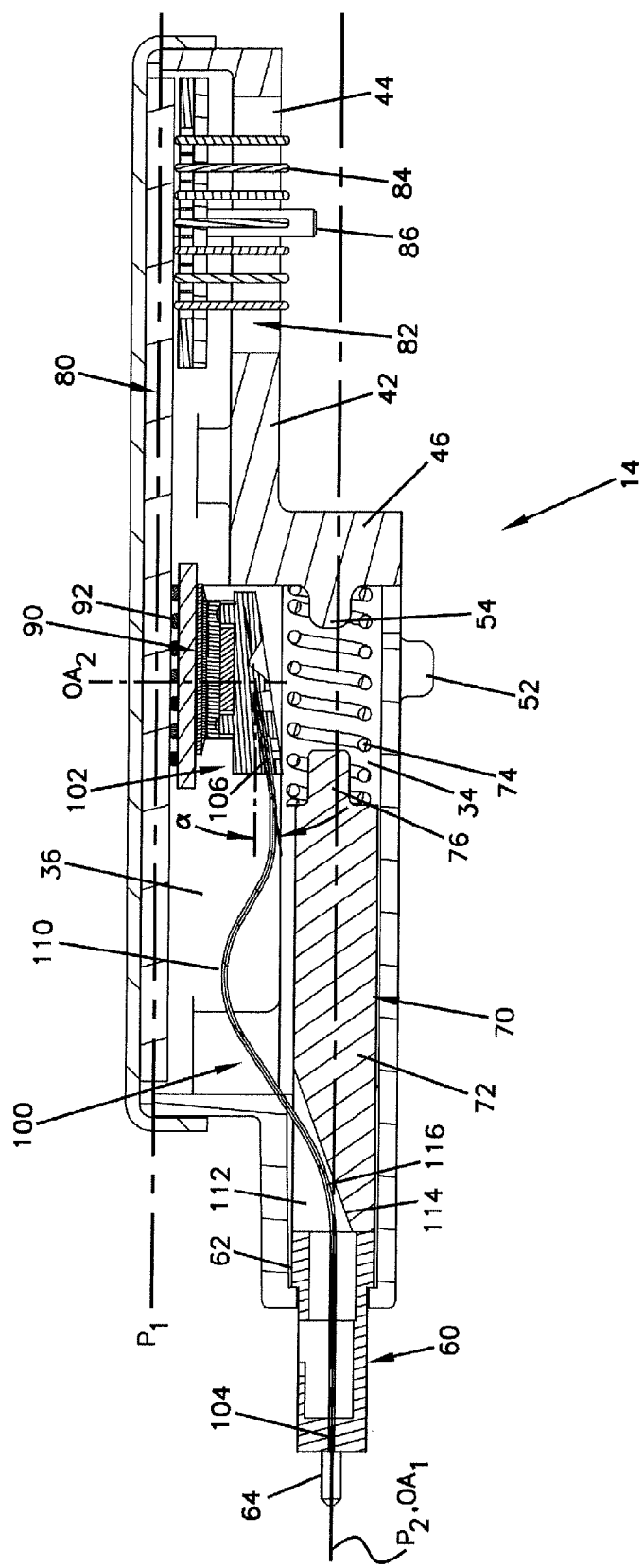
FIG. 4 is a longitudinal cross-sectional view taken along line 4-4 of FIG. 2.

With reference to FIGS. 3 and 4, the first package body 26 is a generally hollow structure having an opening 32 at one end thereof through which an optical fiber connector (discussed further below) extends. The opposite end of the package body 26 is substantially open. The interior of the package body 26 defines a lower cavity or open region 34 that receives the optical fiber connector and a biasing mechanism (discussed further below), and an upper cavity or open region 36 that receives other components discussed further below. The outside of the package body 26 is formed with opposite channels 38 with detents 40 at the ends of the channels (only one channel and detent is visible in FIG. 3).

Figure 2:
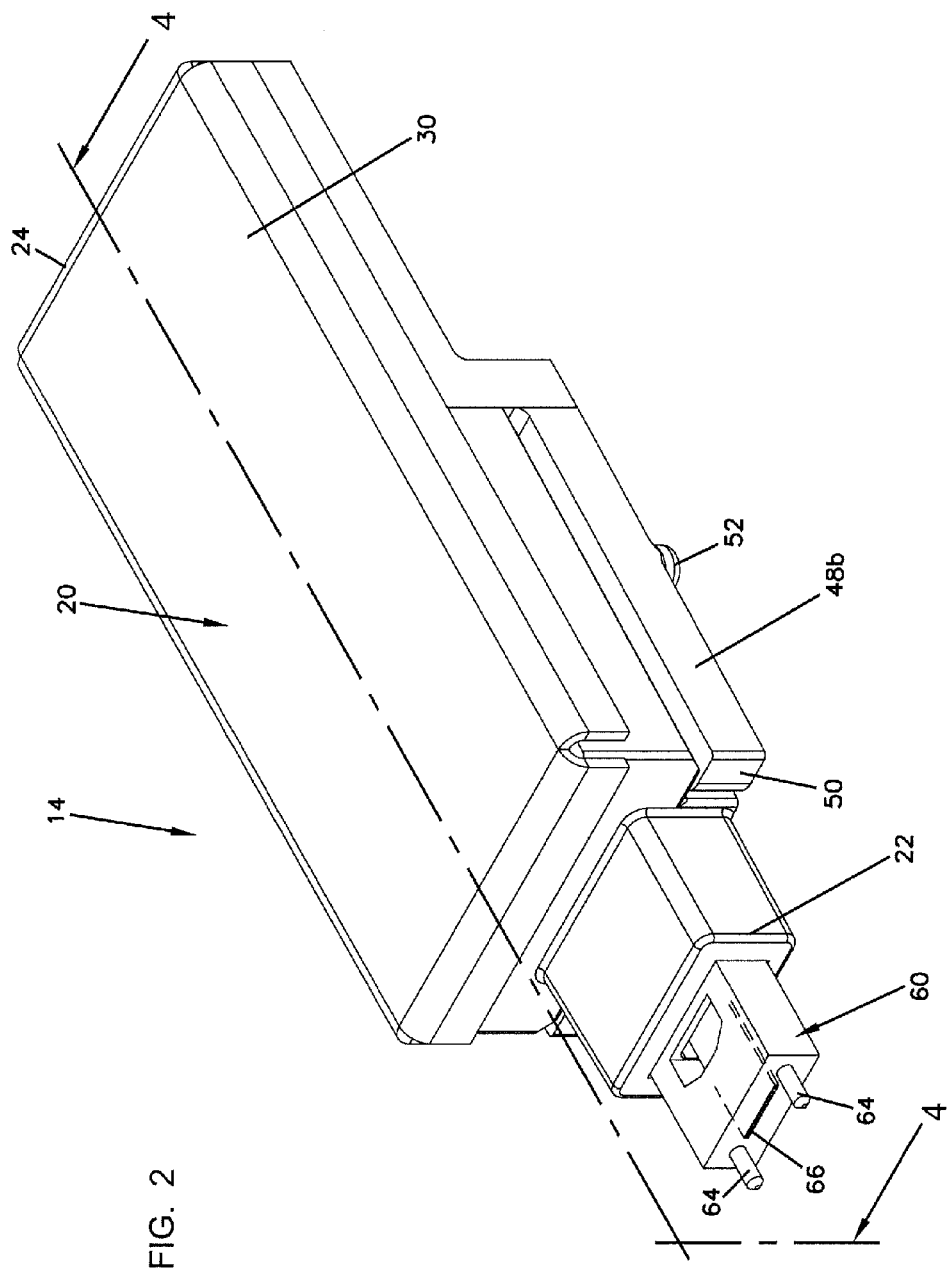
FIG. 2 is a perspective view of the optical connector assembly.

With reference to FIGS. 2-4, the second package body 28 comprises a horizontal shelf structure 42 having an opening 44 formed therethrough. A vertical wall 46 extends downwardly from the front of the shelf structure 42, and a pair of spaced arms 48a, 48b extend from the wall 46 in a direction toward the first end 22. The arms 48a, 48b each include a detent 50 at the distal end thereof. In use, the arms 48a, 48b, channels 38, and the detents 40, 50 form a snap fit connection to connect the package body 26 and the package body 28. As shown in FIG. 2, the arms 48a, 48b slide in the channels 38 on either side of the package body 26 until the detents 50 snap fit behind the detents 40, thereby locking the package bodies together.

Each of the arms 48a, 48b also includes a locating protrusion 52 extending downwardly therefrom. The location protrusions 52 are positioned and configured to fit into locating holes 53 formed in the mounting area 16 of the circuit card 12 for positioning the connector assembly. In addition, as best seen in FIGS. 3 and 4, the vertical wall 46 includes a spring detent protrusion 54 around which an end of a biasing spring is disposed for fixing the end of the spring.

Figure 5:
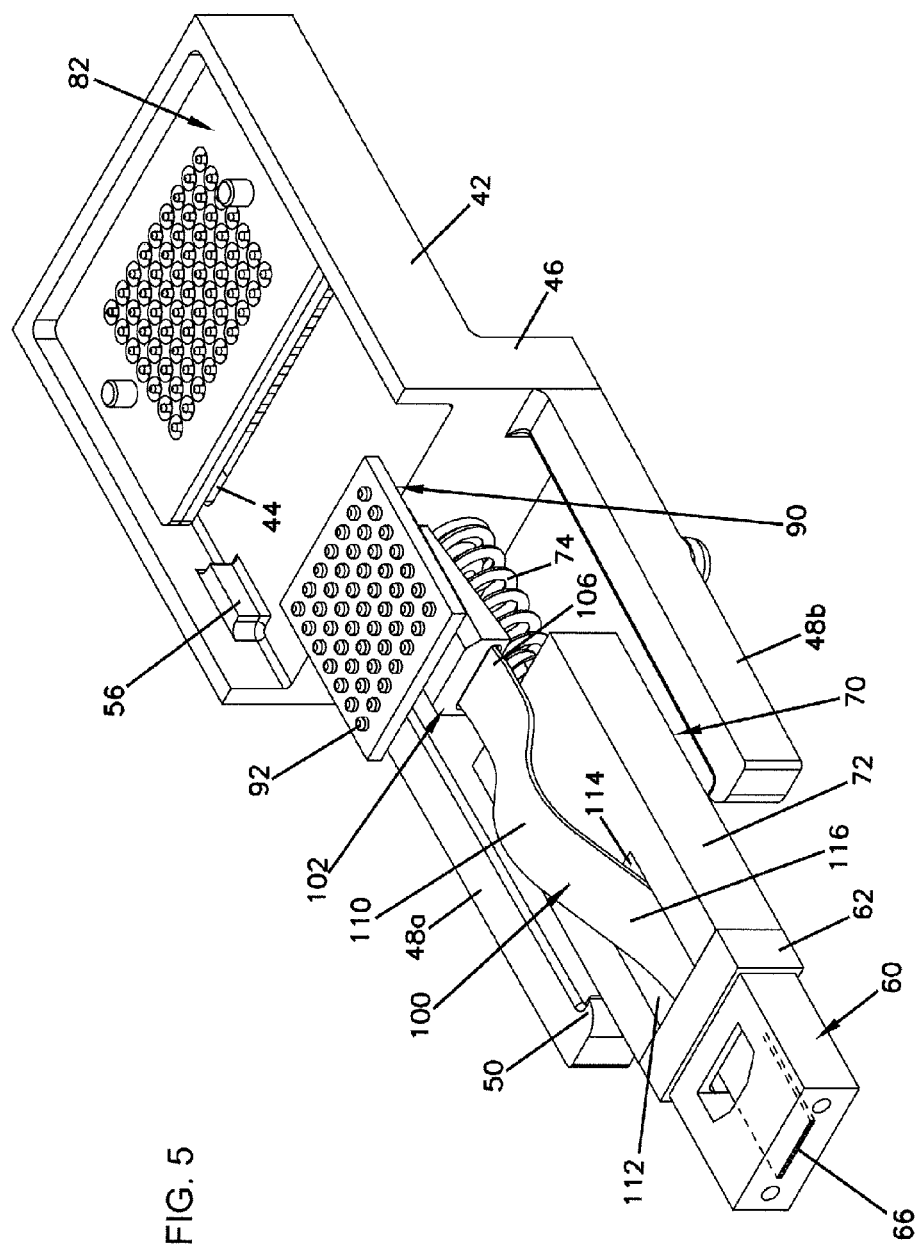
FIG. 5 is a perspective view of a portion of the optical connector assembly to illustrate the interaction between the optical fiber ribbon and the block of the biasing mechanism.

In addition, with reference to FIG. 5, the interior of the horizontal shelf structure 42 is provided with a plurality of ledges 56 (only one ledge is visible in the figures) that in use supports a circuit board of the connector assembly. Similar ledges (not visible) are formed in the upper cavity 36 of the first package body 26 for supporting the circuit board.

Turning to FIGS. 2-5, an optical fiber connector 60 is adjacent to the first end 22 of the housing structure 20 and is at least partially disposed in the housing structure. In particular, an end of the fiber connector 60 extends through the opening 32 and into the port 18 to expose the end outside the housing structure to permit establishment of an optical connection with the connector assembly 10, while an opposite end 62 of the connector 60 is enlarged to retain the end 62 in the lower cavity 34 of the first package body 26.

The optical fiber connector 60 can be any type of optical fiber connector suitable for establishing optical connections with the connector assembly 10. For example, in the illustrated embodiment, the optical fiber connector 60 is a mechanical transfer (MT) connector having connector pins 64 and exposed ends 66 of optical fibers. The construction and operation of optical fiber connectors, including MT connectors, is well known in the art.

With reference to FIGS. 3-5, a biasing mechanism 70 is at least partially, and in the illustrated embodiment completely, disposed within the housing structure 20. In particular, the biasing mechanism 70 is disposed in the lower cavity 34. The biasing mechanism 70 acts on the optical fiber connector 60 to bias the optical fiber connector toward the first end 22. Any form of biasing mechanism that achieves the biasing effect can be used. In the illustrated example, the biasing mechanism 70 comprises a block 72 that abuts against the end 62 of the connector 60, and that extends rearward in the lower cavity 34 to a rear end. A coil spring 74 disposed in the lower cavity 34 is disposed between the rear end of the block 72 and the vertical wall 46 for applying the biasing force. A spring detent protrusion 76 is provided on the rear end of the block 72 around which the second end of the spring 74 is disposed for fixing the second end of the spring. Although a coil spring has been described as being used to apply the biasing force, other mechanisms capable of applying a biasing force can be used.

A circuit board 80 is disposed within the housing structure 20. In the illustrated embodiment, the circuit board 80 is oriented in a generally horizontal plane and extends longitudinally with a first portion disposed within and supported by the horizontal shelf structure 42 and a second portion supported by the first package body 26 and disposed within the upper cavity 36.

The first portion of the circuit board 80 includes an electrical connector 82 mounted thereon so as to position the electrical connector 82 adjacent to the second end 24. The electrical connector 82 is mounted on the downward facing surface of the circuit board 80 at a location corresponding to the opening 44. The opening 44 exposes the electrical connector outside the housing structure 20 to permit establishment of an electrical connection between the assembly 14 and the circuit card 12. Although the electrical connector 82 is described and illustrated as being mounted on the board 80, the connector 82 could be separate from, but electrically connected to, the board 80, for example by being mounted on a circuit board that is separate from the circuit board 80.

The electrical connection can be any high speed electrical connection that one finds suitable for use with the connector assembly 14. In the illustrated example, the electrical connector 82 includes a pin array 84 that extends down from the electrical connector and through the opening 44 for electrical connection to a mating connector on the circuit card. Alternatively, Fuzz Button® technology available from Custom Interconnects, LLC of Centennial, Colo. could also be used as the electrical connector. A pair of locating pins 86 also extend downwardly from the electrical connector 82 for installation within locating holes 88 (seen in FIG. 1) in the circuit card in the mounting area 16 to help properly position the connector assembly 14 on the circuit card.

The circuit board 80 also includes at least one optical die element suitable for transmitting and/or receiving optical signals and driver circuitry for the optical die element mounted thereon. In the illustrated embodiment, the optical die element and driver circuitry are part of a micro-electronic optical core 90 that is available from Ultra Communications, Inc. of Vista, Calif.

In one embodiment, the optical core 90 includes both a transmitter die and a receiver die, as well as driver circuitry for each. The transmitter die can be any device configured to transmit optical signals. For example, the transmitter die can be a vertical cavity surface emitting laser (VCSEL) array die. The receiver die can be any device configured to receive optical signals. For example, the receiver die can be a pin diode array (PDA). The driver circuitry is configured to convert optical signals into electrical signals in the case of receiver die driver circuitry, or convert electrical signals into optical signals for transmission by the transmitter die in the case of transmitter die drive circuitry. The function and operation of transmitter and receiver die and their driver circuitry is known to those of ordinary skill in the art.

Other combinations and numbers of dies can be employed on the core 90. For example, a single die that performs both transmit and receive functions (i.e. a transceiver die) could be used. In addition, two or more transmitter dies, or two or more receiver dies, or two or more transceiver dies, or any combination thereof, could be employed. The number of die and the function of the die depend at least in part on the intended function(s) of the connector assembly 14.

The optical core 90 can be mounted to the circuit board 80 using any suitable mounting technique, for example using a ball grid array 92 (see FIGS. 4 and 5) that is compression bonded or soldered to the board.

The circuit board 80 also includes electric circuitry that electrically connects the driver circuitry of the optical core 90 and the electrical connector 82 so that electrical signals can be transmitted between the core 90 and the electrical connector 82. The configuration and arrangement for providing electric circuitry on a circuit board for electrically connecting components is known in the art.

With reference to FIG. 4, the circuit board 80, the optical core 90 and the electrical connector 82 are illustrated as being disposed generally on a first horizontal plane $P_1$, while the optical fiber connector 60 and the biasing mechanism 70 are disposed generally on a second horizontal plane $P_2$ that is generally parallel to the first plane $P_1$ and spaced vertically beneath the first plane. In addition, the optical fiber connector 60 has a first optical axis $OA_1$ that is defined by the plane $P_2$ while the optical die element(s) on the optical core 90 has a second optical axis $OA_2$ that is generally perpendicular to the first optical axis $OA_1$.

As a result of this arrangement, optical signals in the connector assembly 14 need to be deflected 90 degrees from the first optical axis $OA_1$ to the second optical axis $OA_2$ and vice versa. Further, the optical signals need to be transmitted between the optical fiber connector 60 and the optical core 90.

As best seen in FIGS. 4 and 5, transmission of the optical signals between the optical fiber connector 60 and the optical core 90 is achieved using an optical fiber ribbon 100 while deflection of the optical signals is achieved using an optical deflecting device 102. The fiber ribbon 100 is completely disposed within the housing structure 20 and has a first end 104 optically connected to the optical fiber connector 60 and defining the exposed ends 66 and a second end 106 optically connected to the optical deflecting device 102.

The optical deflecting device 102 is also completely disposed within the housing structure and is mounted on the optical core 90 adjacent to the optical die element. The optical deflecting device 102 is configured to deflect an optical path to and from the optical die element of the optical core 90 and the second end 106 of the fiber ribbon 100, whereby optical signals from the fiber ribbon 100 are appropriately deflected upward at the correct angle to be received by the optical die element(s) and whereby optical signals from the optical die element(s) are appropriately deflected at the correct angle into the second end 106 of the fiber ribbon.

The optical deflecting device 102 can be any device that can receive optical signals and deflect the path of the optical signals. A suitable optical deflecting device is the PRIZM® LightTurn® Ferrule, part number 14012 available from US Conec of Hickory, N.C. Another example of a suitable optical deflecting device that can be used is the lens array described in U.S. Pat. No. 7,399,125.

With reference to FIG. 4, the second end 106 of the fiber ribbon enters and connects to the optical deflecting device 102 at an angle α relative to a horizontal axis. In one embodiment, the angle α is less than or equal to approximately 8 degrees. In another embodiment, the angle α is equal to approximately 8 degrees. Because of the angle α, and because the optical signals enter/exit the optical fiber connector along the first optical axis $OA_1$ and enter/exit the optical die element(s) along the second optical axis $OA_2$, the optical path of the signals are deflected a total angle of greater than or equal to approximately 90 degrees. For example, the optical path is deflected between approximately 90 degrees and 98 degrees. In another example, the optical path is deflected approximately 98 degrees.

Due to the fragile nature of the optical fiber ribbon 100 which is coupled to the moveable optical fiber connector 60, the design of the connector assembly 14 accommodates the movements of the optical fiber connector 60 without damaging the optical fiber ribbon 100. In particular, with reference to FIGS. 4 and 5, the optical fiber ribbon 100 is provided with a first curved region 110 between the ends 104, 106. The first curved region 110 is disposed within the upper cavity 36 of the first package body 26. If the optical fiber connector 60 moves backward, the first curved region 110 is pushed upward in the cavity 36 accommodating the movement of the connector 60. The gap between the top of the curved region 110 and the cover 30 is sufficient to allow upward deflection of the curved region 110 through all anticipated movements of the connector 60.

Additionally, as best seen in FIG. 5, the block 72 includes a slot 112 formed therein through which the fiber ribbon 100 passes while leading to the connector 60. The width of the slot 112 is slightly greater than the width of the fiber ribbon 100 to permit minimal side-to-side shifting of the fiber ribbon 100 and to permit flexing of the fiber ribbon without frictionally engaging the sides of the slot 112. The slot 112 further includes a sloped surface 114 that is positioned opposite or adjacent to a second curved region 116 in the fiber ribbon 100. The second curved region 116 forms a smooth transition between the first curved region 110 and the horizontal extent of the fiber ribbon in the connector 60.

Returning to FIGS. 2-4, once the other components are assembled, the cover 30 is applied to close off the open tops of the package body 26 and the package body 28 and protect the components inside the housing structure 20. In one embodiment, the cover is adhesively bonded in place, but other attachment techniques can be used.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A connector assembly, comprising:
   a housing structure having a first end and a second end;
   an optical fiber connector adjacent to the first end of the housing structure and at least partially disposed in the housing structure, the optical fiber connector being exposed outside the housing structure to establish an optical connection with the connector assembly;
   a biasing mechanism at least partially disposed within the housing structure and acting on the optical fiber connector to bias the optical fiber connector toward the first end;
   an electrical connector adjacent to the second end of the housing structure and at least partially disposed in the housing structure, the electrical connector being exposed outside the housing structure to establish an electrical connection with the connector assembly;
   a circuit board disposed within the housing structure, the circuit board including at least one optical die element and driver circuitry for the optical die element disposed thereon;
   electric circuitry connecting the driver circuitry and the electrical connector;

an optical deflecting device disposed within the housing structure adjacent to the optical die element and configured to deflect an optical path to and from the optical die element;

an optical fiber ribbon disposed within the housing structure and having a first end optically connected to the optical fiber connector and a second end optically connected to the optical deflecting device, the optical fiber ribbon has a first curved region between the first end and the second end thereof, and the curved region is disposed within a cavity in the housing structure; and wherein the biasing mechanism includes a block engaged with an end of the optical fiber connector, the block includes a slot formed therein, the slot includes a sloped surface, and the optical fiber ribbon passes through the slot and has a second curved region disposed within the slot adjacent to the sloped surface.

2. A connector assembly, comprising:

a housing structure;

an optical fiber connector at least partially disposed in the housing structure, the optical fiber connector being exposed outside the housing structure to establish an optical connection with the connector assembly;

a biasing mechanism acting on the optical fiber connector to bias the optical fiber connector toward a first position;

an electrical connector at least partially disposed in the housing structure, the electrical connector being exposed outside the housing structure to establish an electrical connection with the connector assembly;

at least one optical die element and driver circuitry for the optical die element disposed in the housing structure;

electric circuitry connecting the driver circuitry and the electrical connector;

an optical deflecting device disposed within the housing structure and configured to deflect an optical path to and from the optical die element;

an optical fiber ribbon disposed within the housing structure and having a first end optically connected to the optical fiber connector and a second end optically connected to the optical deflecting device;

the second end of the optical fiber ribbon enters and connects to the optical deflecting device at an angle relative to a horizontal axis; and the optical fiber ribbon has a first curved region between the first end and the second end thereof, the first curved region is disposed within a cavity in the housing structure, and the first curved region is curved in a direction away from the biasing mechanism.

3. The connector assembly of claim 2, wherein the optical deflecting device deflects the optical path greater than or equal to approximately 90 degrees.

4. The connector assembly of claim 2, wherein the angle is less than or equal to approximately 8 degrees.

5. The connector assembly of claim 2, comprising a plurality of the optical die elements and driver circuitry for each of the optical die elements disposed in the housing structure, and each of the die elements is selected from the group consisting of an optical transmitter die, an optical receiver die, and a transceiver die.

6. The connector assembly of claim 2, wherein the connector assembly is configured for a 10 GHz data rate.

7. The connector assembly of claim 2, wherein the die element and the electrical connector are disposed on a first horizontal plane, the optical fiber connector and the biasing mechanism are disposed on a second horizontal plane spaced from the first horizontal plane, the optical fiber connector has a first optical axis, and the at least one optical die element has a second optical axis that is generally perpendicular to the first optical axis.

8. The connector assembly of claim 2, wherein the biasing mechanism includes a block engaged with an end of the optical fiber connector, the block includes a slot formed therein, and the optical fiber ribbon is disposed in the slot in the block.

9. The connector assembly of claim 8, wherein the slot includes a sloped surface, and the optical fiber ribbon passes through the slot and has a second curved region disposed within the slot adjacent to the sloped surface.

* * * * *